United States Patent [19]

Casey

[11] Patent Number: 4,811,103

[45] Date of Patent: Mar. 7, 1989

[54] INTERLACE INVERSION CORRECTOR FOR A PICTURE-IN-PICTURE VIDEO SIGNAL GENERATOR

[75] Inventor: Robert F. Casey, Plainsboro, N.J.

[73] Assignee: RCA Licensing Corporation, Princeton, N.J.

[21] Appl. No.: 32,124

[22] Filed: Mar. 30, 1987

[51] Int. Cl.$^4$ ...................... H04N 5/262; H04N 5/272
[52] U.S. Cl. ...................................... 358/183; 358/22
[58] Field of Search ........................... 358/183, 22, 181

[56] References Cited

U.S. PATENT DOCUMENTS

| | | | |
|---|---|---|---|
| 4,249,213 | 2/1981 | Imaide et al. | 358/183 |
| 4,267,560 | 5/1981 | Ishikawa et al. | 358/22 |
| 4,656,515 | 4/1987 | Christopher | 358/183 |
| 4,724,487 | 2/1988 | Casey | 358/183 |

OTHER PUBLICATIONS

"LM1881 Video Sync Separator"; National Semiconductor; Apr. 1986.

*Primary Examiner*—Tommy P. Chin
*Attorney, Agent, or Firm*—Eugene M. Whitacre; Paul J. Rasmussen; Eric P. Herrmann

[57] ABSTRACT

A picture-in-picture video signal generator includes a source of an auxiliary video signal, and a producer of successive samples representing the auxiliary video signal. A self-sequencing memory includes a data input terminal coupled to the producer of auxiliary video samples; a write address input terminal, for receiving an initial write address; a data output terminal and a read address input terminal for receiving an initial read address. Write control circuitry is coupled to the write address terminal of the self-sequencing memory, and generates initial write addresses in synchronism with horizontal line intervals of the auxiliary video signal. A source of a main video signal is also provided. An interlace inversion detector is coupled to the main and auxiliary video signal sources and produces an inversion detect signal indicating that an interlace inversion condition has been detected. Read control circuitry is coupled to the read address terminal of the self-sequencing memory, and generates initial read addresses in synchronism with horizontal line intervals of the main video signal and generates a modified sequence of initial read addresses in response to the inversion detect signal. The main video signal is combined with samples from the self-sequencing memory to form a video signal representing a picture-in-picture image.

8 Claims, 4 Drawing Sheets

| LINE 1 | BLOCK 1 | 0 | 1 | 2 | 3 | 4 | 5 | 6 | 7 | 8 | 9 |
| --- | --- | --- | --- | --- | --- | --- | --- | --- | --- | --- | --- |
| | BLOCK 2 | 10 | 11 | 12 | 13 | 14 | 15 | 16 | 17 | 18 | 19 |
| | BLOCK 3 | 20 | 21 | 22 | 23 | 24 | 25 | 26 | 27 | 28 | 29 | not used   30     31

| LINE 2 | BLOCK 1 | 32 | 33 | 34 | 35 | 36 | 37 | 38 | 39 | 40 | 41 |
| --- | --- | --- | --- | --- | --- | --- | --- | --- | --- | --- | --- |
| | BLOCK 2 | 42 | 43 | 44 | 45 | 46 | 47 | 48 | 49 | 50 | 51 |
| | BLOCK 3 | 52 | 53 | 54 | 55 | 56 | 57 | 58 | 59 | 60 | 61 | not used   62     63

INTERLACE INVERSION CORRECTOR FOR A PICTURE-IN-PICTURE VIDEO SIGNAL GENERATOR

The present invention relates to apparatus for correcting improper interlacing of the main and auxiliary pictures in a video signal system for generating a signal simultaneously representing both a main picture and an auxiliary picture.

BACKGROUND OF THE INVENTION

Known picture-in-picture television receiver include two video signal channels, a main and an auxiliary channel, each including a tuner; an IF chain; and a video detector. The information from the auxiliary channel is compressed and stored in a memory in synchronism with the auxiliary video signal. This stored information is retrieved in synchronism with the main video signal and replaces a portion of the main video signal at a predetermined image location. In this way, a picture-in-picture video signal is formed representing an image having a first region which displays the main video image, as represented by the main video signal and a second, usually smaller, region which displays the auxiliary video image, as represented by the auxiliary video signal.

An NTSC standard video signal consists of successive frames of 525 lines made up of two interlaced fields of 262½ lines each. Odd fields, which contain lines 1, 3, 5, . . . etc., alternate in time with even fields, which contain lines 2, 4, 6, . . . etc. to form the 525 line image. A sampled data processed NTSC signal sample at a rate of, for example, four times the color subcarrier frequency contains 910 samples in each line.

The auxiliary video signal is compressed by, for example, storing in the memory only every third sample of every third line. Each field of compressed auxiliary image information, thus, comprises 87 lines of 303 samples each. Odd compressed fields may contain information from every third odd line, e.g. lines 1, 7, 13, . . . etc., and even compressed fields may contain information from every third even line, e.g. lines 4, 10, 16, . . . etc., of the 525 line image.

In every NTSC field of video information, 21 lines form a vertical blanking interval (VBI) and do not contain image information. These lines need not be compressed, stored or displayed in the inserted auxiliary image. Only the remaining 242 lines contain image information and need be compressed into 80 lines (⅓ of 242), stored and displayed to form the auxiliary image. In addition, approximately 150 samples of each line of sampled data video information, form a horizontal blanking interval (HBI) and do not contain image information. These samples need not be compressed, stored in memory or displayed in the inserted auxiliary image. Only the remaining 760 samples contain image information and need be compressed into 253 samples (⅓ of 760), stored in memory, and displayed to form the auxiliary image.

In each field of the main video signal, a portion, consisting of 253 adjoining samples of 80 adjoining lines, is replaced by the previously stored field of compressed auxiliary samples. If this portion is located in the lower right hand corner, for example, samples 607 through 859 (totaling 253 samples) of lines 182 through 261 (totaling 80 lines) of each field of the main video signal are replaced with the previously stored compressed auxiliary video samples to form the picture-in-picture video signal. In an odd field of the main video signal, the affected lines are lines 363, 365, 367, . . . 519 and 521 (totaling 80 lines) of the 525 line picture-in-picture video signal image. In an even field, the affected lines are lines 364, 366, 368, . . . 520 and 522 (totaling 80 lines) of the 525 line picture-in-picture video signal image.

The system described above inserts previously stored samples representing the auxiliary video signal into a sampled data main video signal. Alternatively, the previously stored samples may be converted into a continuous signal and inserted into a corresponding portion of the continuous main video signal.

If the previously stored field of the auxiliary video signal is from an odd field, and it is inserted into an odd field of the main video signal, and an even field of the auxiliary video signal is inserted into an even field of the main video signal, then lines 363, 364, 365, 366, etc. of the 525 line picture-in-picture video signal contains lines 1, 4, 7, 10, etc. of the 525 line auxiliary video signal respectively.

If, however, the previously stored field of the auxiliary video signal is from an even field and it is inserted into an odd field of the main video signal, and an odd field of the auxiliary video signal is inserted into an even field of the main video signal, then lines 363, 364, 365, 366, etc. of the 525 line picture-in-picture video signal contains lines 4, 1, 10, 7, etc. of the 525 line auxiliary video signal, respectively. The interlace of the auxiliary video image in the picture-in-picture video image is, thus, inverted and the display is objectionable. This situation, when detected, must be corrected so that proper interlacing may be maintained. The interlace inversion condition may be detected by comparing the timing of a main odd/even signal to an auxiliary odd-/even signal.

The interlace inversion condition may be corrected by rearranging the lines of the auxiliary video signal in the picture-in-picture video image. When the interlace inversion condition is detected, the inserted picture is constructed as follows. The lines inserted into the odd field of the main video signal are retrieved and inserted in the normal manner. The order of the lines inserted into the even field, however, is modified in that the first line inserted into the main video signal is the second line previously stored instead of the first. That is, when the interlace inversion condition is detected and when an even field of the main video signal is being scanned, line 1 of the auxiliary video signal is not displayed as the top line of the inserted image. Instead line 7 of the auxiliary video signal is displayed as the top line of the inserted image. As a result, lines 349, 350, 351, 352, etc. of the 525 line picture-in-picture video signal include lines 4, 7, 10, 13, etc. respectively, of the auxiliary video image. This sequence is properly interlaced.

Dual port memories have recently become available which have a high memory capacity, that is they are capable of storing a full field of video information, and are priced such that integration into a consumer television receiver is economically practical. The HM 53051 P, 262,144 word 4-bit frame memory, manufactured by Hitachi, is such a dual port video memory system. These high capacity memory chips allow flexibility in use which was previously unavailable with lower capacity memory integrated circuits.

Such a memory may be envisioned as being subdivided into three blocks, each capable of storing one field of compressed auxiliary video information. Successive fields of compressed auxiliary video information are written into these blocks in round robin fashion. Fields of previously stored compressed auxiliary video information are retrieved from the blocks, also in round robin fashion, so that no block is written into and read from simultaneously.

The HM 53031 P memory operates differently from normal random access memories (RAMs). Normal RAMs include a data input terminal and an address input terminal. Both a data sample and an address corresponding to the storage location into which the sample is to be stored must be supplied for each sample to be stored. The HM 53031 P also includes a data input terminal and a write address terminal. Only one initial write address is applied to the write address terminal. The memory generates subsequent successive addresses internally to store samples in sequential storage locations beginning at the location corresponding to the initial write address. The HM 53031 P further includes a data output terminal and a read address terminal. Retrieval of data operates in a similar manner. An initial read address is applied to the read address terminal. Samples are retrieved from sequential locations in the memory beginning at the location corresponding to the initial read address. In the remainder of this application, such a memory will be referred to as a self-sequencing memory. It is desirable to use such a self-sequencing memory in a picture-in-picture video signal generator.

SUMMARY OF THE INVENTION

In accordance with principles of the present invention, a picture-in-picture video signal generator includes a source of an auxiliary video signal, and a producer of successive samples representing the auxiliary video signal. A self-sequencing memory includes a data input terminal coupled to the producer of auxiliary video samples; a write address input terminal for receiving an initial write address; a data output terminal and a read address input terminal for receiving an initial read address. Write control circuitry is coupled to the write address terminal of the self-sequencing memory, and generates initial write addresses in synchronism with horizontal line intervals of the auxiliary video signal. A source of a main video signal is also provided. An interlace inversion detector is coupled to the sources of the main and auxiliary video signals and produces a detector signal indicating that an interlace inversion condition has been detected. Read control circuitry is coupled to the read address terminal of the self-sequencing memory, and generates initial read addresses in synchronism with horizontal line intervals of the main video signal and generates modified initial read addresses in response to the detector signal. Means are provided for combining the main video signal with samples from the self-sequencing memory to form a signal representing a picture-in-picture image.

DETAILED DESCRIPTION

For simplicity, in all of the Figures, equalizing delays, which may be required in various paths between processing blocks, have been omitted. A person skilled in the art of circuit design would understand where these delays are required and how to implement them properly. In addition, the system illustrated in the Figures will produce a black-and-white picture-in-picture video signal. Three such systems may be combined to form a color picture-in-picture video signal. The three may operate on a luminance and two color difference signals, or on red, green and blue color signals. In the detailed description below, both the main and auxiliary video signals are assumed to be sampled data signals. The main video signal may be a continuous signal, and the video signal generator will still operate according to the invention.

Figure 1:
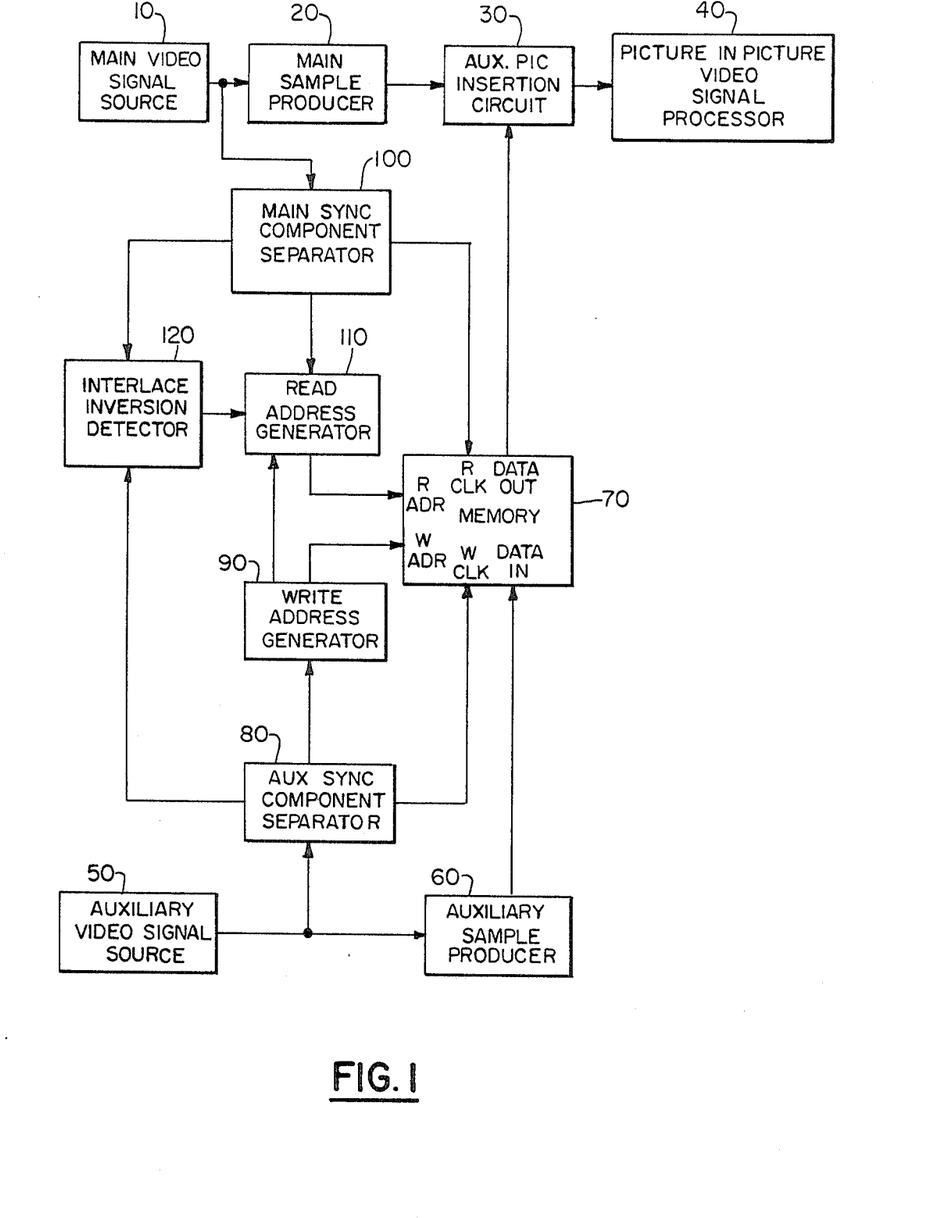
FIG. 1 is a block diagram of an exemplary embodiment of a picture-in-picture video signal generator employing an interlace inversion corrector according to the present invention.

In FIG. 1, a source 10 produces a main video signal. This source may, for example, include an antenna, tuner, IF chain, video detector and luminance/chrominance separator as found in a standard color television receiver. An output terminal of the main video signal source 10 is coupled to an input terminal of a main sample producer 20. An output terminal of main sample producer 20 is coupled to a first input terminal of an auxiliary picture insertion circuit 30. An output terminal of auxiliary picture insertion circuit 30 is coupled to an input terminal of a picture-in-picture video signal processor 40. Video signal processor 40 may include video amplifiers, a picture tube and deflection circuitry as found in a standard color television receiver.

A source 50 supplies an auxiliary video signal. The auxiliary video signal source 50 may comprise, for example, a second tuner, IF chain, video detector, and luminance/chrominance separator similar to those which may be found in the main video signal source 10. An output terminal of the auxiliary video signal source 50 is coupled to an input terminal of an auxiliary sample producer 60. An output terminal of auxiliary sample producer 60 is coupled to a data input terminal of a self-sequencing memory 70. A data output terminal of self-sequencing memory 70 is coupled to a second input terminal of the auxiliary picture insertion circuit 30.

The output terminal of the auxiliary video signal source 50 is also coupled to an input terminal of an auxiliary synchronization component separator 80. A first output terminal of auxiliary synchronization separator 80 is coupled to a write clock input terminal (W CLK) of memory 70. A second output terminal of the auxiliary synchronization component separator 80 is coupled to an input terminal of a write address generator 90. A third output terminal of auxiliary synchronization component separator 80 is coupled to a first input terminal of an interlace inversion detector 120. A first output terminal of the write address generator 90 is coupled to a write address input terminal (W ADR) of memory 70. A second output terminal of write address generator 90 is coupled to a first input terminal of read address generator 110. The combination of auxiliary synchronization component separator 80 and write address generator 90 form circuitry which controls the writing of auxiliary video signal samples into self-sequencing memory 70.

The output terminal of main video signal source 10 is also coupled to an input terminal of a main synchronization component separator 100. A first output terminal of main synchronization component separator 100 is coupled to a read clock input terminal (R CLK) of memory 70. A second output terminal of main synchronization component separator 100 is coupled to a second input terminal of a read address generator 110 and a third output terminal of main synchronization component separator 100 is coupled to a second input terminal of interlace inversion detector 120. An output terminal of read address generator 110 is coupled to a read address input terminal (R ADR) of memory 70. An output terminal of interlace inversion detector 120 is coupled to a third input terminal of read address generator 110. The combination of main synchronization component separator 100 and read address generator 110 form circuitry which controls the reading of previously stored samples from self-sequencing memory 70.

In operation, auxiliary sample producer 60 produces successive samples representing an auxiliary image, organized as successive frames of alternating odd and even fields. Samples from the auxiliary sample producer 60 are stored in predetermined locations in self-sequencing memory 70 in synchronism with the auxiliary video signal. This synchronism is maintained by the clock signal supplied from first output terminal of the auxiliary synchronization component separator 80 to the write clock input terminal (W CLK) of memory 70. A sample from auxiliary sample producer 60 is stored in memory 70 when a clock signal is supplied to the write clock input terminal (W CLK). A clock signal is generated for every third sample of every third line in a known manner. U.S. Pat. No. 4,249,213 describes a system for storing samples in this manner.

Samples from only every third line of the auxiliary video signal are stored in self-sequencing memory 70 as part of the compressed auxiliary video signal. In order to store the samples of the compressed auxiliary video signal in the correct location in memory, a write address is supplied to memory 70 for each line of compressed auxiliary video signal to be stored. This address corresponds to the location into which the first sample of that line is to be stored. Before the beginning of the selected lines of the auxiliary video signal, write address generator 90 supplies that address to the write address terminal (W ADR) of memory 70. Samples of the selected line of the auxiliary video signal field are stored in sequential memory locations beginning at that write initial location.

Samples from self-sequencing memory 70, representing the compressed auxiliary video signal image, are substituted for appropriate main video signal samples in the auxiliary picture insertion circuitry 30. The reading of these previously stored samples from memory 70 is in synchronism with the main video signal source. This synchronism is maintained by the clock signal supplied from the first output terminal of the main synchronization component separator 100 to the read clock input terminal (R CLK) of memory 70. A sample is read from memory 70 and is presented to the data output terminal when a clock signal is supplied to the read clock input terminal (R CLK).

In the example described above, samples 607 through 859 (totaling 253 samples) of lines 182 through 261 (totaling 80 lines) of the main video signal are replaced with previously stored compressed auxiliary video samples retrieved from memory 70. A counter in the main synchronization component separator 100 counts lines of the main video signal and generates a signal when lines 182 through 261 are being scanned. Another counter counts samples within lines of the main video signal and generates a signal when samples 607 through 859 are being scanned. The concurrence of these two signals indicate that auxiliary video signal samples are to be retrieved from memory 70. Read clock signals at the main video signal sampling rate are supplied to memory 70 during the period of concurrence.

In order to retrieve samples representing the correct line from memory 70, a read address must be supplied to memory 70 corresponding to the location of the first sample of that line. Before the 607th sample of each of lines 182 through 261 of the main video signal, read address generator 110 supplies an address to the read address terminal (R ADR) of memory 70. This address corresponds to the predetermined read initial location in the memory 70 for the line to be inserted. Samples of the previously stored auxiliary video signal are retrieved from sequential memory locations beginning at this read initial location.

In order to detect the interlace inversion condition, interlace inversion detector 120 receives signals from the third output terminals of the auxiliary 80 and main 100 synchronization component separators, respectively. These signals indicate whether the current field of the corresponding video signal is an odd field or an even field. The interlace inversion detector 120 supplies a detector output signal to the read address generator 110 which indicates that the interlace inversion condition described above has been detected. An example of such a detector is illustrated in FIG. 2, and described below.

Figure 6:
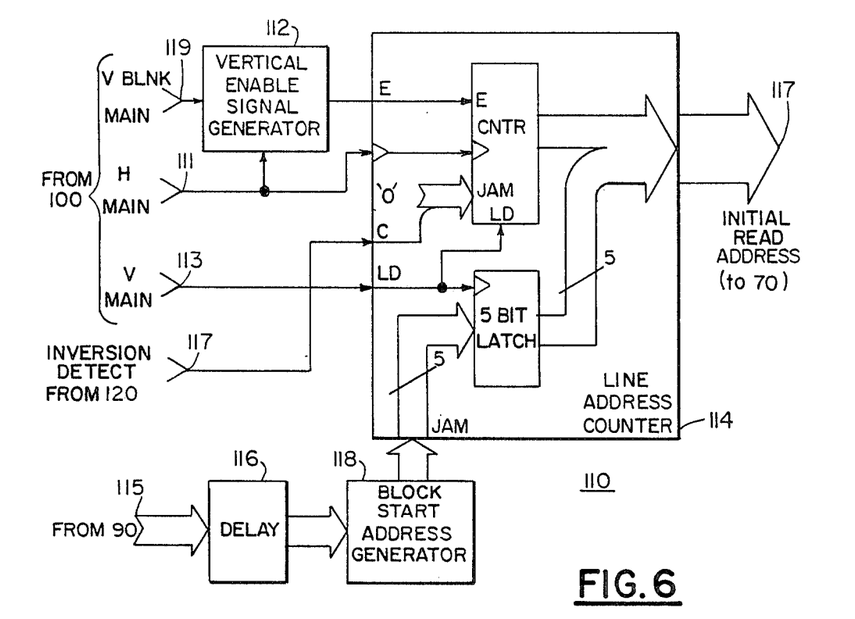
FIG. 6 is a block diagram of a read address generator according to the present invention which may be used in the picture-in-picture video signal generator illustrated in FIG. 1.

In response to this detector output signal, the read address generator 110 generates initial read addresses, which are modified with respect to the normal initial read address in order to correct the interlace inversion. As described above, when the interlace inversion condition is detected, the sequence of write initial addresses for the lines inserted into the odd field of the main video signal remained unchanged, however, the sequence of write initial addresses for the lines inserted into the even field begin with write initial address corresponding to the second line previously stored, (i.e. line 7), instead of the first (i.e. line 1). Lines 349, 350, 351, 352, etc. of the modified 525 line picture in picture video signal, thus include lines 4, 7, 10, 13, etc. respectively, of the auxiliary video signal. This sequence is properly interlaced. An example of such a read address generator 110 is illustrated in FIG. 6, and described below.

Figure 2:
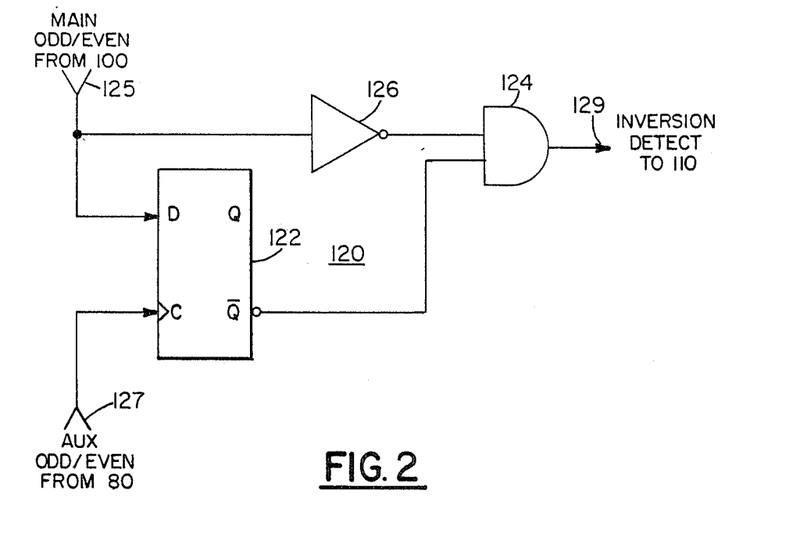
FIG. 2 is a logic diagram of an interlace inversion detector which may be used in the picture-in-picture video signal generator illustrated in FIG. 1.

FIG. 2 illustrates an embodiment of an interlace inversion detector 120 which may be used in the picture-in-picture video signal generator illustrated in FIG. 1. In FIG. 2, an input terminal 125 is coupled to the third output terminal of the main synchronization component separator 100 (of FIG. 1), and receives a signal indicating whether the current main video field is an even or an odd field. Input terminal 125 is coupled to a D input terminal of a D-flip flop 122 and an input terminal of an inverter 126. An output terminal of inverter 126 is coupled to a first input terminal of an AND gate 124. A $\overline{Q}$ output terminal of D-flip flop 122 is coupled to a second input terminal of AND gate 124. An output terminal of AND gate 124 is coupled to an output terminal 129 of the interlace inversion detector 120. Output terminal 129 is coupled to the third input terminal of read address generator 110 (of FIG. 1). An input terminal 127 is coupled to the third output terminal of the auxiliary synchronization component separator 80 (of FIG. 1), and receives a signal indicating whether the current auxiliary field is an even or an odd field. Input terminal 127 is coupled to a clock input terminal (indicated by the small triangle) of the D-flip flop 122.

Figure 3:
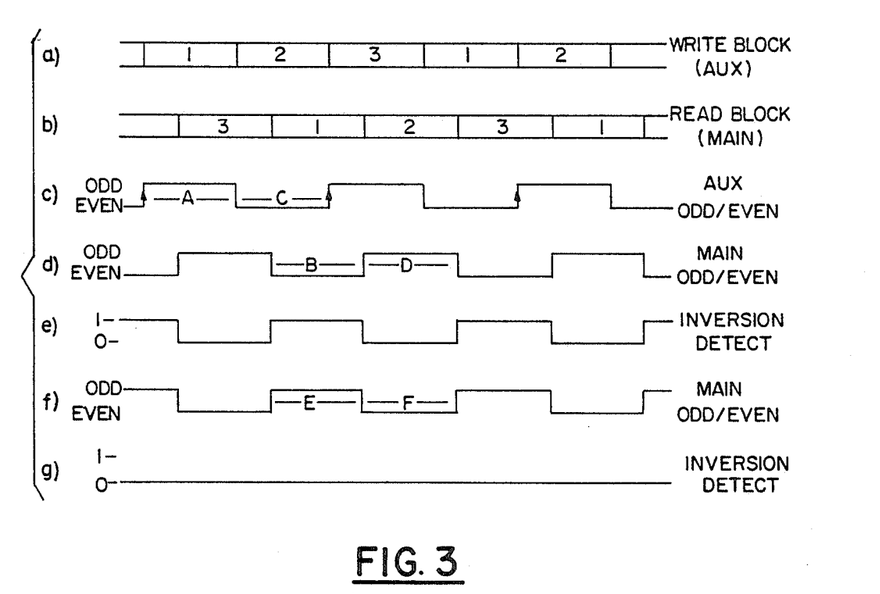
FIG. 3 is a timing diagram useful in understanding the operation of a picture-in-picture video signal generator of FIG. 1 employing the interlace inversion detector illustrated in FIG. 2.

The operation of the interlace inversion detector illustrated in FIG. 2 may be better understood by referring to the waveform diagrams illustrated in FIG. 3. As described above, self-sequencing memory 70 (of FIG. 1) be envisioned as being subdivided into three blocks designated 1, 2 and 3. Each block of memory has sufficient capacity to hold a field of compressed auxiliary video signal information. Successive fields of auxiliary video signal samples are written into successive blocks of the memory 70 in round robin fashion. In FIG. 3, waveform (a) is divided into blocks representing auxiliary video signal field time intervals. The number within each division indicates the block number into which compressed data representing that auxiliary video field is being written. For example, the field scanned during the leftmost field time period is written into block 1; the next field is written into block 2; the next into block 3; and so forth. Waveform (b) is divided into blocks representing main video signal field time intervals. The number within each division represents the block from which data is read and inserted into the main video signal to form the picture-in-picture video signal. For example, the left-most field is read from block 3; the next field from block 1; the next from block 2; and so forth. This sequence of the reading and writing blocks results in no block being written into and read from simultaneously. So that proper sequencing may be maintained, information from the write address generator 90 (of FIG. 1) may be supplied to the read address generator 110, as shown in FIG. 1.

Waveform (c) indicates the odd/even status of the auxiliary video signal. The leftmost auxiliary video signal field is an odd field; the next field is an even field; and so forth. Waveform (d) is the odd/even status of the main video signal. The leftmost main video signal field is an odd field; the next field is even; and so forth.

During field time period A in waveform (c), an odd field of the auxiliary video signal is written into block 1 of self-sequencing memory 70 (of FIG. 1). During field time period B in waveform (d), block 1 is retrieved from memory 70 and inserted into the main video signal. However, the main video signal is scanning an even field. During field time period C of waveform (c), an even auxiliary video field, is written into block 2. During field time period D of waveform (d), block 2 is inserted into an odd main video field. Under these circumstances, the auxiliary image interlace is inverted and some correction must be made. The correction, as described above, may be: beginning the retrieval of samples from memory 70 (of FIG. 1) from the second stored line during even main video fields.

Referring again to FIG. 2, the state of the signal at the D input terminal of D flip-flop 122 is latched at the Q output terminal (and its inverse at the $\overline{Q}$ output terminal) at the leading edge of the signal at the clock input terminal. Referring to FIG. 3, waveform (c) is presented to the clock input terminal, and waveform (d) to the D input terminal. Waveform d) is a logic '0' signal at every leading edge of waveform (c) (indicated by small arrows). The $\overline{Q}$ output terminal is, thus, a logic '1' signal.

This logic '1' signal at the input terminal of AND gate 124 enables it to pass the signal at its other input terminal. This signal is an inverted version of the main odd-/even status signal and is illustrated as waveform (e). When the output of AND gate 124 is a logic '1' signal, then the read address generator 110 (of FIG. 1) is conditioned to present its modified initial read address sequence to memory 70 (of FIG. 1), and presents its normal initial read address sequence otherwise.

Referring again to FIG. 3, waveform (f) illustrates the opposite main video signal odd/even phasing to that of waveform (d). In this case, during field time period E, odd field auxiliary video samples previously written into block 1 (during field time period A of waveform (c)), are inserted into an odd main video field. During field time period F, even field auxiliary video samples, previously written into block 2 (during field time period C of waveform (c)), are inserted into an even main video field. Under these circumstances, no correction is needed.

In this case, waveform (c) is presented to the clock input terminal of D flip-flop 122 and waveform (f) is presented to the D input terminal. Waveform (f) is a logic '1' signal at every leading edge of waveform (c) The Q output terminal is, thus, a logic '0' signal. AND gate 124 is disabled and produces a logic '0' signal, which is illustrated as waveform (g), at its output terminal. Read address generator 110 (of FIG. 1) is thus, conditioned to generate only its normal initial read address sequence.

Figure 4:
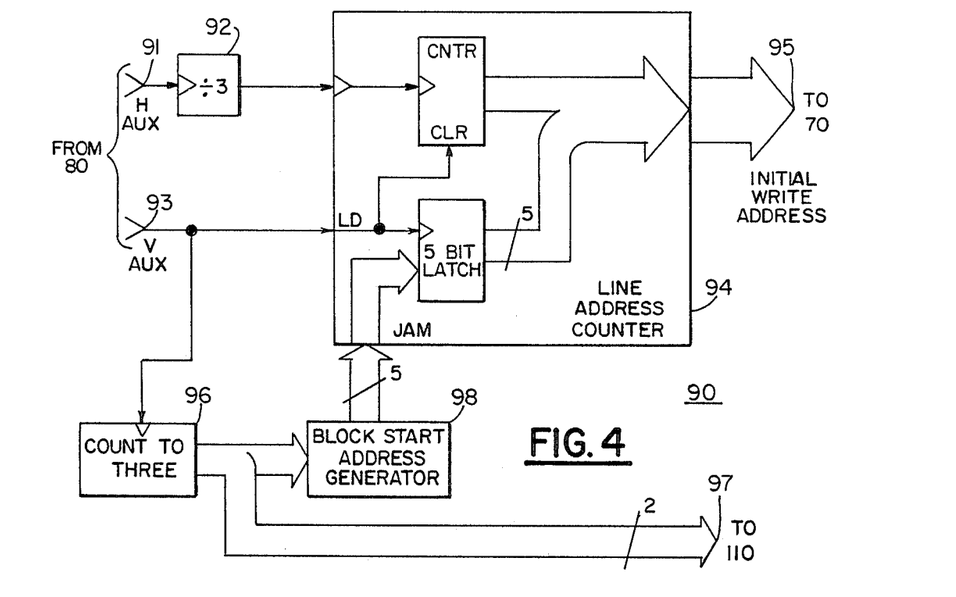
FIG. 4 is a block diagram of an embodiment of a write address generator which may be used in the picture-in-picture video signal generator illustrated in FIG. 1.

FIG. 4 illustrates an embodiment of a write address generator 90 which may be used in the picture-in-picture video signal generator illustrated in FIG. 1. In FIGS. 4 and 6, thick lines represent multi-bit digital signal paths and thin lines represent single-bit digital signal paths. Write address generator 90 supplies an initial write address to self-sequencing memory 70 (of FIG. 1) for each line of compressed auxiliary video signal to be stored. The auxiliary synchronization component separator 80 of FIG. 1 supplies a signal having two components: a horizontal synchronization component H AUX, and a vertical synchronization component V AUX.

In FIG. 4, input terminal 91 is coupled to auxiliary synchronization component separator 80 (of FIG. 1), and receives the horizontal synchronization component H AUX. Input terminal 91 is coupled to a clock input terminal (indicated by a small triangle) of a divide-by-3 counter 92. An output terminal of divide-by-3 counter 92 is coupled to a clock input terminal of line address counter 94. An output terminal 95 of line address counter 94 is coupled to the write address terminal (W ADR) of self-sequencing memory 70 (of FIG. 1), and carries the initial write address for each line of the compressed auxiliary video signal.

An input terminal 93 is also coupled to auxiliary synchronization component separator 80 (of FIG. 1), and receives the vertical synchronization component V AUX. Input terminal 93 is coupled to an input terminal of a count-to-3 counter 96 and a load input terminal LD of line address counter 94. An output terminal 97 of count-to-3 counter 96 is coupled to a block start address generator 98 and to read address generator 110 (of FIG. 1). An output of block start address generator 98 is coupled to a jam input terminal of line address counter 94.

The write address generator 90 of FIG. 4, in combination with the HM 53051 P memory chip (described above) may be configured to allocate samples representing compressed auxiliary video information to memory locations in the following manner. The HM 53051 P self-sequencing memory stores groups of 32 samples in each storage location. As described above, each line of compressed auxiliary video information consists of 303 samples. Thus, 10 storage locations are required to store each line of compressed auxiliary video information. Also as described above, three blocks of memory, each capable of storing one field consisting of 87 lines, are allocated to store compressed auxiliary video information.

Figure 5:
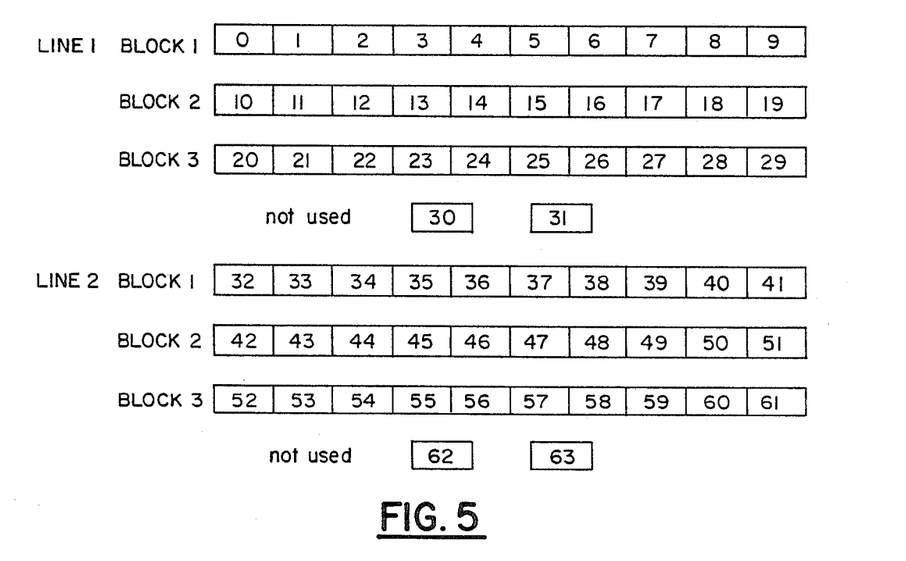
FIG. 5 is a memory allocation diagram illustrating a possible memory allocation scheme for the picture-in-picture video signal generator illustrated in FIG. 1.

In FIG. 5, selected storage locations in self-sequencing memory 70 (of FIG. 1) are illustrated as rectangles. The address which corresponds to that storage location is denoted by its value within the rectangle representing that location. Each row of rectangles represents ten sequential storage locations; enough to contain one line of compressed auxiliary video information. The topmost row, representing storage locations 0 through 9, is allocated to hold samples representing the first horizontal line of a field of compressed auxiliary video information which is to be stored in block 1 (i.e., line 1 of a field n). The second row, representing storage locations 10 through 19, is allocated to hold samples representing line 1 of a field of compressed auxiliary video information which is to be stored in block 2 (i.e., line 1 of a field n+1); and the third row is allocated to hold samples representing line 1 of block 3 (i.e., line 1 of a field n+2)

The fourth row, which represents storage locations 32 through 41, is allocated to hold samples representing the second line of the field of compressed auxiliary video information to be stored in block 1. The fifth row is allocated to hold samples representing line 2 of block 2, and the sixth row is allocated to hold samples representing line 2 of block 3. This pattern continues for all 87 lines. The two memory locations corresponding to addresses 30 and 31 are not allocated to storage of compressed auxiliary video samples. Neither are memory locations corresponding to addresses 62 and 63. Two memory locations remain unallocated for every three lines of compressed auxiliary video signal.

When a field of compressed auxiliary video information is to be written into block 1 of self-sequencing memory 70 (of FIG. 1), write address counter 90 first produces an address signal having the value 0. This is the address corresponding to the location allocated to store the first group of 32 samples in line 1 of block 1 (see FIG. 5). Self-sequencing memory 70 stores the next 303 samples in the sequential locations corresponding to addresses 0 through 9, without requiring further address information. Before the beginning of the second line of that compressed field, write address generator produces an address signal having the value 32, the address corresponding to the location allocated to store the first group of samples in line 2 of block 1. The next 303 samples are stored in locations 32 through 41. The value of the address signal produced before each subsequent line of compressed auxiliary video information is 32 more than that of the previous line.

When lines of compressed auxiliary video information are being written into block 2, write address generator 90 first produces an address signal having the value 10. Samples representing line 1 of this field are stored in sequential locations corresponding to addresses 10 through 19. With every subsequent line, the value of the address signal is incremented by 32. Thus, samples representing the second line of block 2 is stored in 10 sequential locations beginning at the location corresponding to address 42, and so forth.

Similarly, the value of the first address produced by write address generator 90 when a field is to be stored in block 3 is 20. Samples representing line 1 of this field are stored in sequential locations corresponding to addresses 20 through 29. As before, with every subsequent line to be stored, the value of the address signal is incremented by 32. Samples representing line 2 of fields to be stored in block 3 are stored in locations 52 through 61, and so forth.

Referring again to FIG. 4, in operation, count-to-three counter 96, responsive to the signal V AUX, produces a signal which represents the block number into which the current field is to be stored. For example, count-to-three counter 96 may produce a two-bit binary signal repetitively sequencing through the values 1, 2 and 3. Block start address generator 98 produces a starting address corresponding to the initial memory location allocated to the first line in that block as described above. When the output of count-to-three counter 96 is 1, the starting address is 0; when the output of count-to-three counter 96 is 2, the starting address is 10; when the output of count-to-three counter 96 is 3, the starting address is 20.

Block start address generator 98 may be a read only memory (ROM) having an address input terminal coupled to the output terminal of count-to-three counter 96 and a data output terminal coupled to the jam input terminal of line address counter 94, with the associated predetermined start address values preprogrammed into the memory locations corresponding to the addresses 1, 2 and 3. Alternatively, block start address generator 98 may be combinatorial logic circuitry which generates the predetermined start address values from the 2-bit output of count-to-three counter 96.

At the beginning of each auxiliary video signal field, the start address from block start address generator 98 is loaded into line address counter 94 in response to the auxiliary vertical synchronization signal V AUX. The output of line address counter is then the same as this predetermined value.

Frequency divider 92 produces a clock pulse at the beginning of every third line of the compressed auxiliary video signal. This clock pulse causes line address counter 94 to increment the value of the signal at its output terminal by 32. The write address counter 90 of FIG. 4 may, thus, produce the properly valued address signals to implement the memory allocation scheme described above.

Line address counter 94 may, for example, comprise a binary counter CNTR and a 5-bit latch. The 5-bit latch has an input terminal coupled to the jam input terminal of line address counter 94, and a clock terminal coupled to the load terminal LD of line address counter 94. The output terminal of the 5-bit latch is coupled to the 5 lower-significance bits of the output terminal of line address counter 94.

The binary counter CNTR has a clear input terminal (CLR) coupled to the load terminal (LD) of line address counter 94, and a clock input terminal coupled to the clock input terminal of line address counter 94. An output terminal of the binary counter is coupled to the remaining higher significance bits of the output terminal of line address counter 94.

In operation, the 5-bit latch is coupled to receive the output of the block start address generator 98. As described above, for block 1 the start address is 0, or '00000' in 5-bit binary; for block 2, the start address is 10, or '01010' in 5-bit binary; for block 3, it is 20 or '10100'. When an auxiliary vertical synchronization signal occurs, the appropriate 5-bit binary value is latched into the 5-bit latch, and becomes the 5 lesser significance bits of the initial write address. At that same time, the binary counter CNTR is cleared to a count of 0. The resulting initial write address is 0, 10, or 20, as appropriate.

As each clock signal occurs at the clock input terminal of the binary counter CNTR, its output value increments by one. Because the 5 lesser significant bits are supplied from the 5-bit latch, when the output from the binary counter CNTR increments by one, the value of the initial write address increments by 32. This arrangement can thus produce the required sequence of initial addresses for the memory allocation scheme illustrated in FIG. 5 in response to the load and clock signals.

FIG. 6 illustrates a read address generator 110 which may be used in the picture-in-picture signal generator illustrated in FIG. 1. In FIG. 6, input terminals 111, 113, and 119 are all coupled to the main synchronization component signal separator 100 (of FIG. 1). Input terminal 111 receives a horizontal synchronization component signal H MAIN, and is coupled to a first input terminal of a vertical enable signal generator 112 and a clock input terminal of line address counter 114. Input terminal 113 receives a vertical synchronization component signal V MAIN and is coupled to a load input terminal LD of line address counter 114. Input terminal 119 receives a vertical blanking signal V BLNK MAIN, and is coupled to a second input terminal of vertical enable signal generator 112. An output terminal of vertical enable signal generator 112 is coupled to an enable input terminal (E) of a line address counter 114. An output terminal of line address counter 114 is coupled to the read address input terminal (R ADR) of memory 70 (of FIG. 1).

An input terminal 115 is coupled to write address generator 90 (of FIG. 1). Input terminal 115 is coupled to an input terminal of delay 116. An output terminal of delay 116 is coupled to an input terminal of a block start address generator 118. An output terminal of block start address generator 118 is coupled to a jam input terminal of line address counter 114. An input terminal 117 is coupled to the output terminal of the interlace inversion detector 120 (of FIG. 1). Input terminal 117 is coupled to a correction enable input terminal C of line address counter 114.

In operation, delay 116 receives a signal which corresponds to the sequence of block numbers represented in waveform (a) of FIG. 3, and produces a signal which corresponds to the sequence of block numbers represented in waveform (b) of FIG. 3. The output signal from delay 116 represents the block number of memory from which previously stored compressed auxiliary video information is to be retrieved. Block start address generator 118 generates the predetermined starting address (i.e., 0, 10 or 20) corresponding to the memory block number in a similar manner to that described above for block start address generator 98 of write address generator 90 (of FIG. 3). The main vertical synchronization signal V MAIN, indicating the start of a new field of main video information, conditions line address counter 114 to load the starting address from block start address generator 118 at the beginning of every main vertical scanning interval. This starting address determines the first initial read address.

Vertical enable signal generator 112 generates an enable signal for line address counter 114. The enable signal is produced while the main video signal is scanning lines 182 through 261, into which previously stored auxiliary video signal information is to be inserted. During the time line address counter 114 is enabled, the main horizontal synchronization component signal H MAIN clock, indicating the start of a new line of main video information, causes the line address counter 114 to increment. Line address counter 114 increments by 32 in a similar manner to the line address counter 94 of the write address generator 90 illustrated in FIG. 3. The output of line address counter 114 is the initial read address for the next line of previously stored compressed auxiliary video information to be inserted into the main video signal. Once this address is supplied to self-sequencing memory 70 (of FIG. 1), subsequent previously stored auxiliary video samples will be retrieved from sequential storage locations of memory 70 without requiring further address information.

When the inversion detect signal at the correction enable input terminal C of line address counter 114 is a logic '0' signal, line address counter 114 operates in the same manner as line address counter 94 of FIG. 4. When the inversion detect signal is a logic '1' signal, however, the sequence of read initial addresses is modified so that retrieval begins at the second line previously stored rather than the first. Referring to FIG. 5, when the inversion detect signal is a logic '1' signal, the first read initial address is 32, 42, or 52 (depending upon which memory block contains the field of information to be retrieved) instead of 0, 10, or 20.

Line address counter 114 may be similar in construction to line address counter 94 of FIG. 4. A 5-bit latch is included and coupled in a similar manner. A presettable binary counter CNTR is included instead of a clearable binary counter. Enable (E), clock and load (LD) input terminals of line address counter 114 are coupled to enable, clock and load terminals of the presettable binary counter CNTR, respectively. The correction enable input terminal C of line address counter 114 is coupled to the least significant bit of a jam input terminal of presettable binary counter CNTR. The remaining bits of the jam input terminal of presettable binary counter CNTR are all coupled to a source of a logic '0' signal.

In operation, when the inversion detect signal is a logic '0', then the presettable binary counter begins counting at 0, at the beginning of each field of the main video signal. The sequence of read initial addresses is the same as the sequence of write initial addresses produced by the write address generator 90 of FIG. 4. When the inversion detect signal is a logic '1' signal, then presettable binary counter CNTR begins counting at 1, at the beginning of each field of the main video signal. The initial read address is 32 if the 5-bit latch contains 0, corresponding to block 1; is 42 if the 5-bit latch contains 10, corresponding to block 2; and is 52 if the 5-bit latch contains 20, corresponding to block 3. Every clock pulse received by presettable binary counter CNTR causes it to increment by 1, which causes the initial read address to increment by 32. This modified sequence of read initial addresses corrects for the interlace inversion problem in the manner described above.

Figure 7:
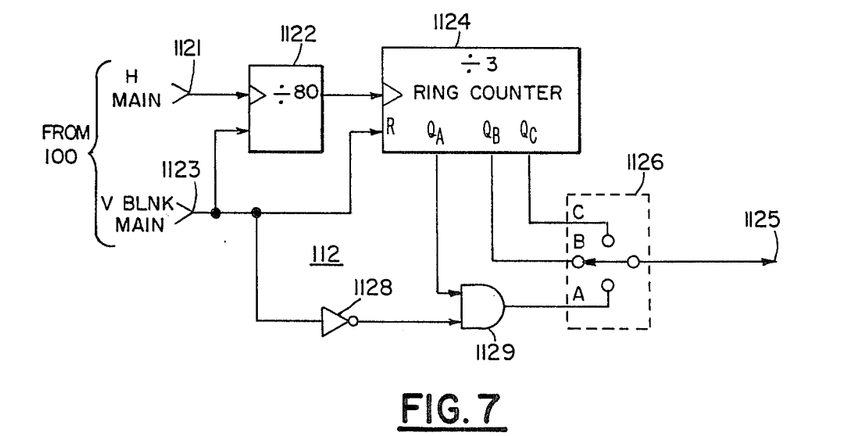
FIG. 7 is a block diagram of a vertical enable signal generator which may be used in the read address generator illustrated in FIG. 5.

FIG. 7 illustrates an embodiment of a vertical enable signal generator 112, which may be used in the read address generator 110 of FIG. 6. Vertical enable signal generator 112 generates a signal indicating that the 80 lines of the main video signal, into which the auxiliary video image is to be inserted, are currently being scanned. This signal is used to enable line address counter 114 of read address generator 110 illustrated in FIG. 6. Until enabled, line address counter 114 produces the address of the storage location containing the first sample of the line in the memory block from which this data is first to be retrieved, i.e. either the first or second line previously stored, depending upon the state of the inversion detect signal from interlace inversion detector 120 of FIG. 1. When enabled, line address counter 114 is incremented by 32 at each subsequent line of the main video signal. It thus produces the address corresponding to the storage location containing the first sample of the corresponding line of the previously stored compressed auxiliary video information.

In FIG. 7, input terminals 1121 and 1123 are coupled to the main synchronization component separator 100. Input terminal 1121 receives horizontal synchronization signal H MAIN. Input terminal 1123 receives vertical blanking signal V BLNK MAIN. Input terminal 1121 is coupled to a clock input terminal of divide-by-80 counter 1122. An output terminal of divide-by-80 counter 1122 is coupled to a clock input terminal of a divide-by-3 ring counter 1124. Ring counter 1124 includes three output terminals $Q_A$, $Q_B$ and $Q_C$. Output terminal $Q_A$ is coupled to a first input terminal of an AND gate 1129. Output terminals $Q_B$ and $Q_C$ are coupled to input terminals B and C of a selector switch 1126, respectively. An output terminal of selector switch 1126 is coupled to an output terminal 1125. Output terminal 1125 is coupled to the enable input terminal (E) of line address counter 114 (of FIG. 6). Input terminal 1123 is coupled to respective reset terminals (R) of divide-by-80 counter 1122 and ring counter 1124, and to an input terminal of an inverter 1128. An output terminal of inverter 1128 is coupled to a second input terminal of AND gate 1129. An output terminal of AND gate 1129 is coupled to an input terminal A of selector switch 1126.

In operation, the main vertical blanking signal V BLNK MAIN, is a logic '1' signal during the first 21 lines of each field of the main video signal, indicating that the vertical blanking interval (VBI as described above) of the main video signal is being scanned, and a logic '0' signal otherwise. This signal conditions the divide-by-80 counter 1122 to reset to 0, and conditions ring counter 1124 to produce logic signals at outputs ($Q_A$, $Q_B$, $Q_C$) of (1,0,0) respectively. During the VBI, the output of inverter 1129 is a logic '0' signal which conditions AND gate 1129 to produce a logic '0' signal regardless of the state of the signal at its other input terminal. Thus, the signals at input terminals A, B and C of selector switch 1126 are all logic '0' signals during the VBI. After the VBI, the main vertical blanking signal is a logic '0' signal. The output of inverter 1128 is a logic '1' signal which conditions AND gate 1129 to pass the signal from output terminal $Q_A$ of ring counter 1124 at its other input terminal through to input terminal A of selector switch 1126 from its output terminal.

During the first 80 lines after the VBI (i.e., lines 22 through 101), the input terminals (A, B, C) of selector switch 1126 receive logic signals (1,0,0), respectively. The main horizontal synchronization component H MAIN causes divide-by-80 counter to increment at the beginning of every main video signal horizontal line. After 80 lines of the main video signal have been counted by divide-by-80 counter 1122, a clock pulse is provided to ring counter 1124. The logic signals at input terminals (A, B, C) then receive logic signals (0,1,0), respectively. These logic signals remain during the next 80 lines (i.e., lines 102 through 181). After another 80 lines is counted by divide-by-80 counter 1122, another clock pulse is supplied to ring counter 1124. Selector switch 1126 and input terminals (A, B, C) then receive logic signals (0,0,1), respectively. These logic signals remain during the next 80 lines (i.e., lines 182 through 261). Input terminal A thus receives a logic '1' signal during a top third of the picture-in-picture image, and a logic '0' signal otherwise; input terminal B receives a logic '1' signal during a middle third and input terminal C receives a logic '1' signal during a lower third of the picture-in-picture image respectively and logic '0' signals otherwise. Selector switch 1126 couples one of the input terminal A, B or C to output terminal 1125. The vertical location of the auxiliary video image in the picture-in-picture video image is selected by enabling line address counter 114 of the read address counter 110 (of FIG. 4) during either the top, middle or bottom third of the picture-in-picture image depending upon the position of selector switch 1126.

In the following claims, the term self-sequencing memory is a memory which stores samples in sequential storage locations beginning at a location corresponding to the last received write address and retrieves samples from sequential storage locations beginning at a location corresponding to the last received read address.

What is claimed is:

1. A picture-in-picture video signal generator comprising:

a source of an auxiliary video signal;

means for producing successive samples representing said auxiliary video signal;

a self-sequencing memory, having a data input terminal coupled to said means for producing samples, having data output, and address input terminals, said address input terminal for receiving initial address values;

write control circuitry coupled between said source of said auxiliary video signal and said address input terminal of said self-sequencing memory, for producing successive initial write address signals, in synchronism with and at the rate of horizontal line intervals of said auxiliary video signal, said successive initial write address signals being generated to condition said self-sequencing memory to store auxiliary video signal from a plurality of field intervals interleaved with on another in said self-sequencing memory;

a source of a main video signal;

an interlace inversion detector having respective input terminals coupled to said main and auxiliary video signal sources, and an output terminal, for producing an inversion detect signal indicating that an interlace inversion condition has been detected;

read control circuitry coupled between said main video signal source and said address input terminal of said self-sequencing memory, and having a detect signal input terminal coupled to said output terminal of said interlace inversion detector, for producing a sequence of successive initial read address signals in synchronism with and at the rate of horizontal line intervals of said main video signal, and producing a modified sequence of successive initial read address signals in response to said inversion detect signal; and means coupled to said data output terminal of said self-sequencing memory and said main video signal source for generating a picture-in-picture video signal.

2. A picture-in-picture video signal generator, comprising:

a source of an auxiliary video signal;

means for producing successive samples representing said auxiliary video signal;

a self-sequencing memory, having a data input terminal coupled to said means for producing samples, having data output, and address input terminals;

write control circuitry coupled between said source of said auxiliary video signal and said address input terminal, for producing successive initial write address signals, in synchronism with horizontal line intervals of said auxiliary video signal;

a source of a main video signal;

an interlace inversion detector having respective input terminals coupled to said main and auxiliary video signal sources, and an output terminal, for producing an inversion detect signal indicating that an interlace inversion condition has been detected;

read control circuitry coupled between said main video signal source and said address input terminal for producing a sequence of successive initial read address signals in synchronism with horizontal line intervals of said main video signal, and producing a modified sequence of successive initial read address signals in response to said inversion detect signal, said read control circuitry including:

a synchronization component separator for producing a main horizontal synchronization signal and a main vertical synchronization signal;

a line address counter, responsive to said main horizontal synchronization signal, and having an enable input terminal, for producing a signal representing said initial read address signal in response to an enable signal at said enable input terminal;

a vertical enable signal generator, responsive to said main horizontal and vertical synchronization signals, and having an output terminal coupled to said enable terminal of said line address counter, for generating said enable signal when currently scanned lines of said main video signal are to have auxiliary video signal inserted therein;

means responsive to said main vertical synchronization signal and said inversion detect signal, for setting said line address counter to a predetermined value at the beginning of a vertical scan of said main video signal; and means coupled to said data output terminal of said self-sequencing memory and said main video signal source for generating a picture-in-picture video signal.

3. The picture-in-picture video signal generator of claim 2, wherein said line address counter increments by an integer value greater than one in response to said main horizontal synchronization signal.

4. The picture-in-picture video signal generator of claim 3, wherein said integer value is 32.

5. The picture-in-picture video signal generator of claim 2, wherein said line address counter comprises:

a latch for producing lower significance bits of said initial read address signal, and a presettable binary counter for producing higher significance bits of said initial read address signal.

6. The picture-in-picture video signal generator of claim 5, wherein said presettable binary counter comprises a multibit jam input terminal having a least significant bit coupled to said output terminal of said interlace inversion detector, and remaining bits coupled to a source of a logic '0' signal.

7. The picture-in-picture video signal generator of claim 7, wherein:

memory locations of said self-sequencing memory are allocated as a plurality of blocks, each of which can store one field of auxiliary video signal information; and said line address counter setting means comprises: means for producing a signal representing the block of said self-sequencing memory from which samples representing a previously stored field of said auxiliary video signal are to be retrieved; a block start address generator, coupled to said block representative signal producing means, for producing a signal representing an initial read address signal of the first line of said block of said self-sequencing memory; and means for setting said line address counter to said initial read address signal of said first line at the beginning of the time period of insertion of said auxiliary video signal information into said picture-in-picture video signal, and for setting said line address counter to an initial read address signal of a second line of said block in response to said inversion detect signal.

8. The picture-in-picture video signal generator of claim 3, wherein:

memory locations of said self-sequencing memory are allocated as a plurality of blocks, each of which can store one field of auxiliary video signal information; and said line address counter setting means comprises: means for producing a signal representing the block of said self-sequencing memory from which samples representing a previously stored field of said auxiliary video signal are to be retrieved; a block start address generator, coupled to said block representative signal producing means, for producing a signal representing an initial read address signal of the first line of said block of said self-sequencing memory; and means for setting said line address counter to said initial read address signal of said first line at the beginning of the time period of insertion of said auxiliary video signal into said picture-in-picture video signal, and for setting said line address counter to an initial read address signal of a second line of said block in response to said inversion detect signal.

* * * * *

UNITED STATES PATENT AND TRADEMARK OFFICE
CERTIFICATE OF CORRECTION

PATENT NO. : 4,811,103

DATED : March 7, 1989

INVENTOR(S) : Robert Francis Casey

It is certified that error appears in the above-identified patent and that said Letters Patent is hereby corrected as shown below:

Column 16, line 24, "claim 7" should be --claim 6--.

Signed and Sealed this

Twenty-third Day of January, 1990

Attest:

JEFFREY M. SAMUELS

*Attesting Officer*     *Acting Commissioner of Patents and Trademarks*